US009137772B2

(12) United States Patent
Hazzani et al.

(10) Patent No.: US 9,137,772 B2

(45) Date of Patent: Sep. 15, 2015

(54) SYSTEM AND METHOD FOR MASS CALIBRATION OF RADIO FREQUENCY FINGERPRINT (RF-FP) LOCATION MEASUREMENTS

(75) Inventors: Gideon Hazzani, Rishon le Zion (IL); Eithan Goldfarb, Ness Ziona (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 542 days.

(21) Appl. No.: 13/011,871

(22) Filed: Jan. 22, 2011

(65) Prior Publication Data

US 2011/0207474 A1 Aug. 25, 2011

(51) Int. Cl.

*H04W 24/00* (2009.01)
*H04W 64/00* (2009.01)
*G01S 5/02* (2010.01)

(52) U.S. Cl.

CPC ............... *H04W 64/00* (2013.01); *G01S 5/021* (2013.01); *G01S 5/0252* (2013.01)

(58) Field of Classification Search

USPC ........................ 455/404.2, 414.1, 422.1, 423, 455/456.1–456.6, 457

See application file for complete search history.

(56) References Cited

U.S. PATENT DOCUMENTS

| | | | | |
|---|---|---|---|---|
| 6,845,246 | B1 * | 1/2005 | Steer | 455/522 |
| 7,400,293 | B2 * | 7/2008 | Fleming | 342/357.52 |
| 2008/0102809 | A1 * | 5/2008 | Beyer | 455/420 |
| 2010/0110948 | A1 * | 5/2010 | Batta | 370/311 |
| 2010/0164781 | A1 * | 7/2010 | Boyer et al. | 342/165 |
| 2010/0311436 | A1 * | 12/2010 | Bevan et al. | 455/456.1 |

FOREIGN PATENT DOCUMENTS

WO 2010116292 A2 10/2010

OTHER PUBLICATIONS

Vedaldi, Andrea, "An implementation of SIFT detector and descriptor," University of California at Los Angeles, 7 pages.

Girardin, Fabien, et al., "Detecting air travel to survey passengers on a worldwide scale," Journal of Location Based Services, 26 pages.

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Patrick Edouard

*Assistant Examiner* — Matthew Genack

(74) *Attorney, Agent, or Firm* — Meunier Carlin & Curfman

(57) ABSTRACT

Systems and methods for location tracking in a communication network. Base stations transmit downlink signals to a plurality of subscriber terminals to define a mapping between geographical locations and respective sets of signal strengths of the downlink signals received from the base stations at the geographical locations. A subset of the subscriber terminals may be selected, and for each subscriber terminal in the subset, first measurements of a geographical location of the subscriber terminal irrespective of the downlink signals is made. Second measurements of the downlink signals received at the subscriber terminal at the geographical location is made and the mapping of the subscribers terminals is updated responsively to the first and second measurements. The geographical locations of the subscriber terminals is updated using the updated mapping.

20 Claims, 2 Drawing Sheets

(56) References Cited

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Meyer, Ulrike, et al., "On the Impact of GSM Encryption and Man-in-the-Middle Attacks on the Security of Interoperating GSM/UMTS Networks," IEEE, 2004, 8 pages.

* cited by examiner

SYSTEM AND METHOD FOR MASS CALIBRATION OF RADIO FREQUENCY FINGERPRINT (RF-FP) LOCATION MEASUREMENTS

FIELD OF THE DISCLOSURE

The present disclosure relates generally to location tracking, and particularly to methods and systems for calibrating Radio Frequency (RF) fingerprint measurements.

BACKGROUND OF THE DISCLOSURE

Mobile communication networks deploy various techniques for measuring the geographical locations of communication terminals. Such techniques are used, for example, for various surveillance applications and for providing Location Based Services (LBS) and emergency services in cellular networks. (In the description that follows, the term "locating users" is used, for the sake of brevity, to mean "locating the communication terminals used by the users." Communication terminals whose locations are tracked are referred to as target terminals or targets.)

Some location tracking techniques, referred to as network-based techniques, are carried out by the base stations and other network-side components, without using dedicated location tracking hardware or software at the mobile terminal side. For example, a technique called Uplink Time Difference of Arrival (U-TDOA) determines the user position by calculating the difference in time required for a user transmission to reach different base station sites. The arrival time measurements are made by Location Measurement Units (LMUs) installed at selected base station sites. Another network-based technique, referred to as Angle of Arrival (AOA), determines the user position by establishing lines of bearing from base station sites to the user.

Other location tracking techniques are terminal-based, i.e., use dedicated hardware or software in the mobile terminal. For example, some techniques use measurements performed by a Global Positioning System (GPS) receiver installed in the communication terminal. In Assisted GPS (A-GPS) techniques, the GPS measurements are assisted by an assistance server external to the mobile terminal. The assistance server is sometimes equipped with another GPS receiver, whose position is known a-priori. Another terminal-based technique is Enhanced Observed Time Difference (E-OTD), in which the terminal measures the time differences between signal arrivals from different base stations. A similar terminal-based technique is called Enhanced Forward Link Trilateration (EFLT).

SUMMARY OF THE DISCLOSURE

An embodiment that is described herein provides a method for location tracking, including:

in a communication network, which includes base stations that transmit downlink signals to a plurality of subscriber terminals, defining a mapping between geographical locations and respective sets of signal strengths of the downlink signals received from one or more of the base stations at the geographical locations;

selecting a subset of the subscriber terminals;

for each subscriber terminal in the subset, obtaining first measurements of a geographical location of the subscriber terminal irrespective of the downlink signals, and obtaining second measurements of the downlink signals received at the subscriber terminal at the geographical location;

updating the mapping responsively to the first and second measurements obtained for the subscriber terminals in the subset; and measuring the geographical locations of at least one of the subscriber terminals in the plurality using the updated mapping.

In some embodiments, the subscriber terminals in the selected subset are operated by respective subscribers of the communication network for conducting communication sessions by the subscribers. In an embodiment, the first measurements for a given subscriber terminal in the subset are based on differences in arrival times of uplink signals from the given subscriber terminal to multiple receivers. In another embodiment, the first measurements for a given subscriber terminal in the subset are measured using a satellite receiver in the given subscriber terminal. In a disclosed embodiment, obtaining the first and second measurements includes time-synchronizing the first and second measurements pertaining to a given subscriber terminal in the subset.

In an embodiment, selecting the subset includes evaluating a selection criterion defined over the communication network, and choosing the subscriber terminals in the subset responsively to the selection criterion. Selecting the subset may include identifying a geographical region in which an accuracy of the mapping is degraded, and adding to the subset at least one subscriber terminal located in the identified geographical region. Additionally or alternatively, selecting the subset may include choosing the subset such that the subscriber terminals in the subset are distributed evenly over a coverage area of the communication network. Further additionally or alternatively, selecting the subset may include verifying that the subscriber terminals in the subset are capable of providing the first measurements. In some embodiment, selection of the subset, obtaining of the first and second measurements and updating of the mapping are performed in a switching element of the communication network.

There is additionally provided, in accordance with an embodiment that is described herein, apparatus for location tracking, including:

an interface, which is configured to communicate with a communication network that includes base stations that transmit downlink signals to a plurality of subscriber terminals;

a storage device, which is configured to store a mapping between geographical locations and respective sets of signal strengths of the downlink signals received from one or more of the base stations at the geographical locations; and a processor, which is configured to select a subset of the subscriber terminals, to obtain for each subscriber terminal in the subset, first measurements of a geographical location of the subscriber terminal irrespective of the downlink signals, to obtain for each subscriber terminal in the subset second measurements of the downlink signals received at the subscriber terminal at the geographical location, to update the mapping responsively to the first and second measurements obtained for the subscriber terminals in the subset, and to measure the geographical locations of at least one of the subscriber terminals in the plurality using the updated mapping.

The present disclosure will be more fully understood from the following detailed description of the embodiments thereof, taken together with the drawings in which:

DETAILED DESCRIPTION OF EMBODIMENTS

Overview

Figure 1:
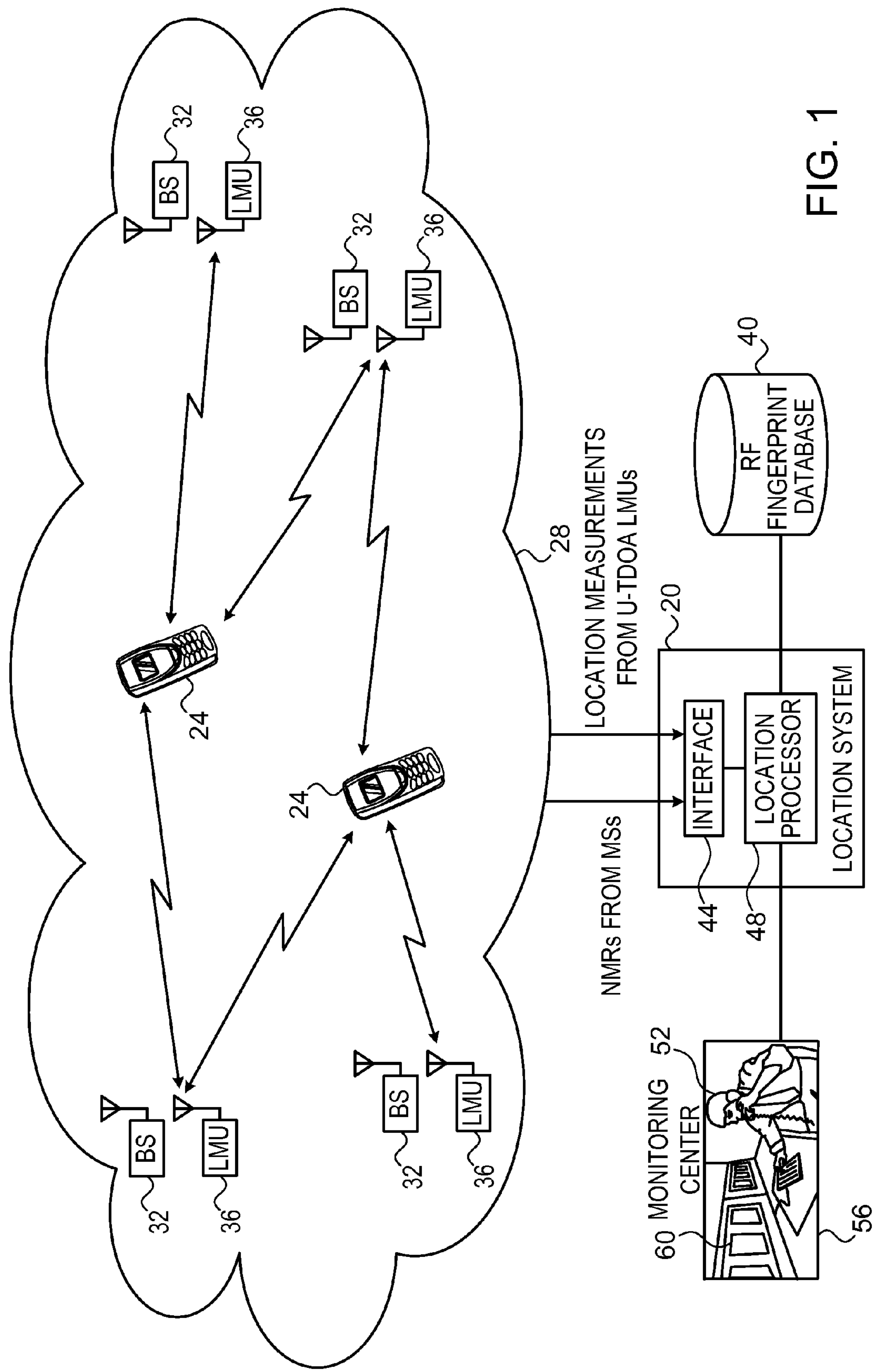
FIG. 1 is a block diagram that schematically illustrates a system for location tracking, in accordance with an embodiment of the present disclosure.

Embodiments that are described hereinbelow provide improved methods and systems for measuring the geographical locations of subscriber terminals in wireless communication networks. In some embodiments, a location system is connected to a wireless communication network, which includes multiple base stations that transmit downlink signals to multiple subscriber terminals. The location system comprises a database, which holds a mapping between geographical locations and respective sets of signal strengths received from one or more base stations at these geographical locations. In other words, each geographical location (e.g., map coordinate) is characterized by a set of signal strengths received at this location from one or more base stations. The set of signal strengths, together with the respective identities of the received base stations, is referred to as the Radio Frequency (RF) fingerprint of the location.

In order to find the geographical location of a certain subscriber terminal, the location system obtains measurements of base station signal strengths from the subscriber terminal in question. As explained above, the set of signal strengths is indicative of the current geographical location of the terminal. Thus, by querying the above-described mapping with the signal strength measurements obtained from the terminal, the location system can assess the current geographical location of the terminal with potentially high accuracy.

In practice, however, location measurements based on RF fingerprints are often sensitive to changes in the signal environment. Any change that affects signal propagation, such as addition or reconfiguration of base stations or even a new building or obstacle, may affect the downlink signal strengths received at different geographical locations and distort the location measurements. In many practical cases, changes of this sort are frequent and cause considerable degradation in location accuracy unless accounted for.

In some embodiments that are described hereinbelow, the location system calibrates the mapping of signal strengths to locations, in order to account for changes in the signal environment that may occur over time. The calibration process uses an alternative location technique, which is supported by the wireless communication network and is not related to reception of downlink signals. Such techniques may comprise, for example, Uplink Time Difference of Arrival (U-TDOA) or Assisted Global Positioning System (A-GPS).

The location system selects a subset of the subscriber terminals to serve as calibration terminals. For each calibration terminal, the location system obtains location measurements using the alternative location technique, and regards these measurements as an accurate reference location of the calibration terminal that is unaffected by downlink signal changes. In addition, the location system obtains downlink signal strength (RF fingerprint) measurements of the calibration terminal at that reference location. The location system then updates the mapping stored in the database to reflect the newly-measured RF fingerprint at the reference location.

The calibration terminals selected by the location system can be ordinary subscriber terminals that are operated by ordinary network subscribers, and not unique terminals that are dedicated to performing calibration functions. Therefore, the calibration process does not require additional resources or logistical effort from the network operator. Using the subscriber terminals for calibration does not affect their ability to conduct communication sessions in the network. The users of the calibration terminals need not be aware that their terminals are being used for calibration.

Typically, subscriber terminals are scattered at any given time throughout the coverage area of the communication network. As such, the location system can apply the calibration processes described herein in any desired area, or even over the entire network. The calibration techniques described herein may therefore be referred to as "mass calibration." Calibration terminals can be selected based on various criteria, and several example criteria are described herein. For example, calibration can be triggered in a particular area upon detecting degradation in RF fingerprint accuracy in that area. Since the calibration process uses actual subscriber terminals that are already located in the relevant area, the mapping can be updated quickly and account for changes in real time.

As noted above, in some embodiments the alternative location measurement technique comprises U-TDOA. In these embodiments, high-accuracy calibration can be achieved for both indoor and outdoor locations. This performance is often unachievable in GPS-based solutions, which typically have poor indoor coverage.

System Description

FIG. 1 is a block diagram that schematically illustrates a system 20 for location tracking, in accordance with an embodiment of the present disclosure. System 20 computes the geographical locations of wireless subscriber terminals 24 of a wireless communication network 28 using Radio Frequency (RF) fingerprint measurements. Network 28 and its BSs and MSs may operate in accordance with any suitable communication standard or protocol such as, for example, Global System for Mobile communications (GSM) or other second generation standards, or Universal Mobile Telecommunications System (UMTS) or other third generation standards. Terminals 24 are also referred to as Mobile Stations (MSs). The MSs may comprise, for example, cellular phones, wireless-enabled mobile computers or Personal Digital Assistants (PDAs), or any other suitable communication or computing device having communication capabilities.

In network 28, MSs 24 communicate with Base Stations (BSs) 32. In particular, BSs 32 transmit downlink signals to the MSs. Consider a given MS, which is located at a certain geographical location within the coverage area of network 28. The MS receives downlink signals from one or more BSs at certain signal strengths. The particular set of signal strengths (together with the respective identities of the BSs whose signals are received at these signal strengths) is indicative of the geographical location, and can therefore be used to locate the terminal. In other words, if a terminal receives a particular set of BSs at certain respective signal strengths, this information can be used to determine the geographical location of the terminal. The set of signal strengths and BS identities is thus referred to as the RF fingerprint of the location.

The RF fingerprints measured and reported by network 28 may comprise any suitable message or event, such as Network Management Reports (NMRs). The downlink signal strengths may be defined and measured in any suitable manner, such as using Received Signal Strength Indication (RSSI) common in second generation cellular standards, or Received Signal Code Power (RSCP) common in third generation cellular standards.

System 20 comprises an RF fingerprint database 40, which holds a mapping between geographical locations and respective sets of downlink signal strengths received from one or more BSs at the geographical locations. For a given geographical location (e.g., a two- or three-dimensional coordinate), the mapping typically indicates a set of downlink signal strengths received at this location, as well as the identities of the BSs that transmit these signals. Database 40 may be stored on any suitable storage device, such as on a magnetic disk or in solid-state memory. The mapping stored in database 40 is typically queried with a set of signal strengths, and returns a geographical location that matches these signal strengths. Thus, the mapping can be used for determining the geographical location of a given MS based on a set of signal strengths (an RF fingerprint) received at the MS.

System 20 comprises an interface 44 for communicating with network 28, and a location processor 48 that carries out the location tracking functions described herein. In particular, processor 48 obtains from network 28 via interface 44 RF fingerprint measurements (NMRs in the present example) reported by various MSs 24, and queries the mapping stored in database 40 with these RF fingerprints so as to determine the geographical locations of the MSs. In some embodiments, e.g., for large cellular networks, processor 48 may comprise multiple processors operating in parallel.

Processor 48 sends the computed geographical locations of the MSs to a monitoring center 56, in which the locations are displayed to an operator 52, e.g., using a display 60. In some embodiments, operator 52 sends a request to system 20 to locate a specific MS 24. In response to this request, system 20 obtains RF fingerprint measurements of the MS in question, computes the MS location based on the fingerprints, and sends the computed location to monitoring center 56 for display.

The system configuration of FIG. 1 is an example configuration, which is shown purely for the sake of conceptual clarity. In alternative embodiments, any other suitable configuration can also be used. For example, the functions of system 20 may be implemented in a switching element (e.g., a Mobile Switching Center—MSC) of network 28. Typically, processor 48 comprises a general-purpose computer, which is programmed in software to carry out the functions described herein. The software may be downloaded to the computer in electronic form, over a network, for example, or it may, alternatively or additionally, be provided and/or stored on tangible media, such as magnetic, optical, or electronic memory.

Calibration of RF Fingerprint Mapping

As can be appreciated, the mapping of RF fingerprints (sets of signal strengths) to geographical locations is sensitive to changes in the signal environment. Various kinds of events may change the RF fingerprint of a given location, i.e., the set of BS signal strengths received at the location. Such events may comprise, for example, addition of a new BS, reconfiguration of an existing BS (e.g., change in BS power, frequency, or antenna orientation), or changes that affect signal propagation (e.g., new buildings, tree or other obstacles). Unless the mapping in database 40 is updated to account for these events or changes, measured RF fingerprints will no longer reflect the true geographical location of the MS. In many practical cases, events of this sort are frequent, and may cause considerable degradation in location accuracy.

In some embodiments, system 20 calibrates the mapping in database 40, so that the mapping is kept up-to-date and accurate. The calibration process uses an alternative location technique, which measures the geographical locations of the MSs. The alternative location technique does not rely on the downlink signals, and is therefore insensitive to changes such as the events described above. Alternative location techniques may comprise, for example, U-TDOA, A-GPS or any other suitable technique. The description that follows refers mainly to calibration using U-TDOA, although the disclosed techniques are similarly applicable to A-GPS or any other suitable technique.

In the example of FIG. 1, network 28 comprises multiple U-TDOA Location Measurement Units (LMUs) 36. Typically although not necessarily, the LMUs are collocated with some of the BSs at the BS sites. Each LMU comprises a receiver that measures the time-of-arrival of uplink signals from a given MS. The MS location is determined by calculating the differences in time-of-arrival to multiple different LMUs. In some embodiments, location processor 48 receives location measurements of certain MSs 24 from LMUs 36.

In order to calibrate the mapping stored in database 40, processor 48 selects a subset of MSs 24 to serve as calibration MSs. Any suitable number of calibration MSs can be selected, and processor 48 may apply any suitable selection criteria for this purpose. Several example selection criteria are described further below. The calibration MSs typically comprise subscriber terminals that are operated by subscribers of network 28, and not dedicated terminals that are used exclusively for calibration. In other words, the calibration terminals are used for conducting communication sessions (e.g., phone calls) by subscribers in network 28, possibly in parallel to the calibration process.

For each calibration MS, processor 48 obtains both RF fingerprint measurements and U-TDOA measurements. Using the two types of location measurements, processor 48 updates the mapping of signal strengths to locations, stored in database 40. For example, processor 48 may regard the U-TDOA location measurement as an accurate reference measurement, and add the RF fingerprint measured at that reference location to the mapping. Processor 48 may replace old measurements in the mapping with the newly-acquired measurements pertaining to similar locations, or combine old measurements with new measurements in any suitable manner. Additionally or alternatively, processor 48 may use any other suitable technique for updating the mapping in database 40 based on corresponding RF-fingerprint and U-TDOA location measurements.

In some embodiments, processor 48 synchronizes the RF fingerprint measurements and the U-TDOA measurements in time domain, so as to correlate them with one another, before updating the mapping. For example, the processor may receive the RF fingerprint measurements and the U-TDOA measurements separately, each with a respective time stamp. The processor synchronizes the RF fingerprint measurements and the U-TDOA measurements using the time stamps.

Figure 2:
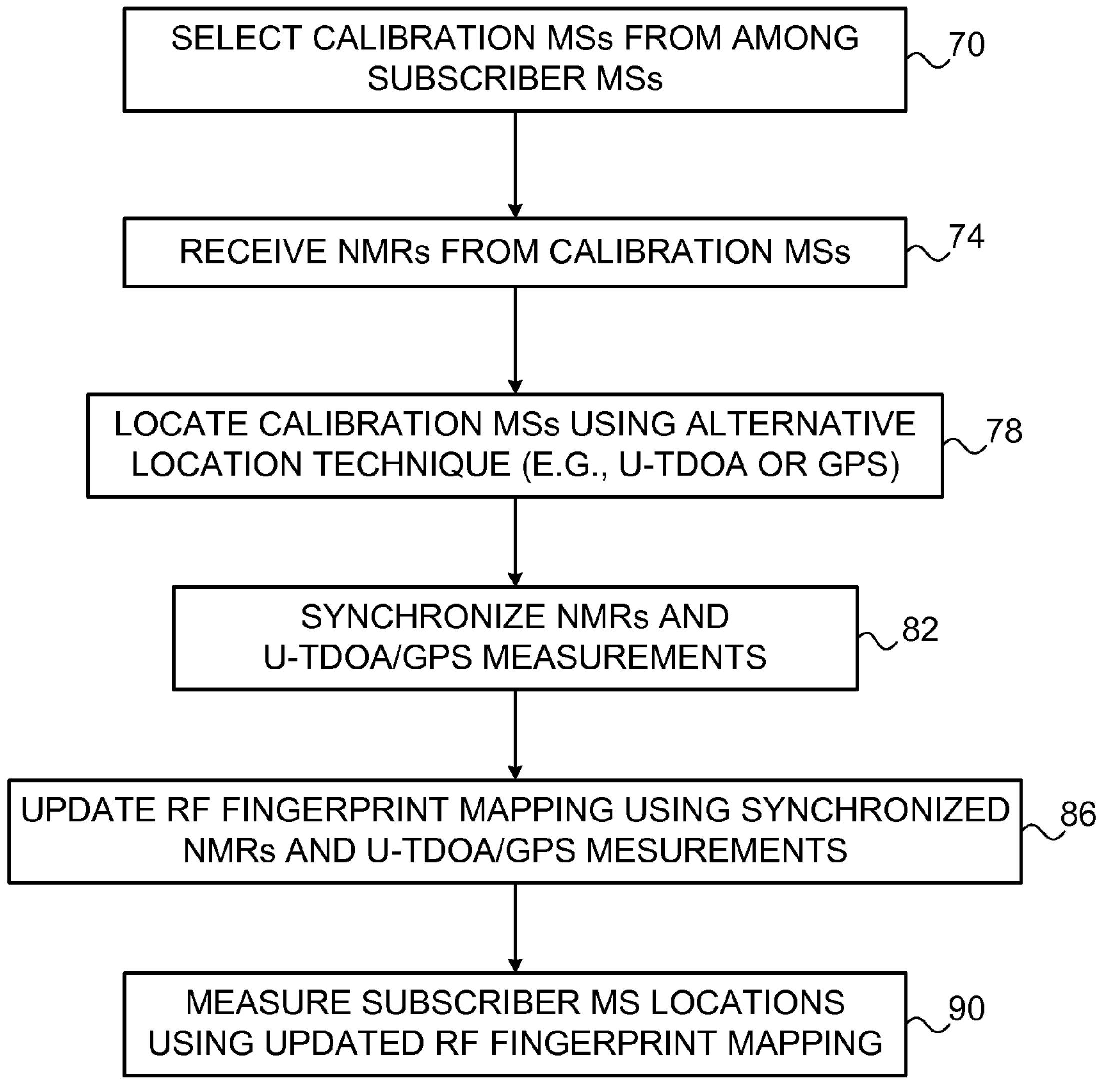
FIG. 2 is a flow chart that schematically illustrates a method for calibrating RF fingerprint data based on U-TDOA measurements, in accordance with an embodiment of the present disclosure.

FIG. 2 is a flow chart that schematically illustrates a method for calibrating RF fingerprint data based on U-TDOA measurements, in accordance with an embodiment of the present disclosure. The method begins with location processor 48 selecting a subset of MSs 24 in network 28 to serve as calibration MSs, at a selection step 70. Processor 48 obtains RF fingerprints (NMRs in the present example) for the calibration MSs, at a fingerprint input step 74. Processor 48 measures the locations of the calibration MSs using the alternative location technique (U-TDOA or A-GPS in this example), at an alternative location step 78. In some embodiments, processor time-synchronizes the NMRs with the U-TDOA or A-GPS measurements, at a synchronization step 82.

Processor 48 updates the mapping in database 40 based on corresponding NMRs and U-TDOA or A-GPS measurements (i.e., based on NMRs and U-TDOA/A-GPS measurements pertaining to the same MS and acquired at a similar time), at an updating step 86. Processor 48 tracks the locations of various MSs in network 28 (which may or may not belong to the subset of calibration MSs) using the updated mapping, at a location tracking step 90. The computed MS locations are displayed to operator 52 on display 60 of monitoring center 56.

When using the calibration methods described herein, the mapping of RF fingerprints to locations in database 40 is continually kept up-to-date and accurate. Processor 48 may calibrate the mapping at any desired region within the coverage area of network 28, by selecting calibration MSs that are located in that region.

The description above referred mainly to the use of U-DTOA as the alternative location technique. In alternative embodiments, the alternative location technique is based on measuring the MS location using a satellite receiver fitted in the MS, such as in A-GPS systems.

Selection Criteria for Calibration MSS

Location processor 48 in system 20 may apply various selection criteria for selecting MSs to serve as calibration MSs. For example, processor 48 may detect that the RF fingerprint accuracy in a certain region is degraded, and therefore select calibration MSs that are currently located in the relevant region. In alternative embodiments, processor 48 may select calibration MSs that are distributed evenly over the coverage area of network 28.

Additionally or alternatively, the selection criterion may be based on the capabilities of the MSs. For example, when the alternative location technique is terminal-based, e.g., when using A-GPS, processor 48 may check whether a given MS supports this location technique before selecting it to serve as a calibration MS. Processor 48 may select MSs whose location measurements using the alternative location technique meet a certain accuracy level. Alternatively, processor 48 may select the calibration MSs at random, or using any other suitable selection criteria.

Processor 48 may perform the calibration process at any desired time, such as at periodic intervals, at random intervals, or in response to a certain event (e.g., automatic detection that RF fingerprint accuracy is degraded, or a request from operator 52).

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method for location tracking, comprising:

in a communication network, which includes base stations that transmit downlink signals to a plurality of subscriber terminals, defining a mapping between geographical locations and respective sets of signal strengths of the downlink signals received from one or more of the base stations at the geographical locations, the communication network further comprising a location system that calibrates the mapping of signal strengths to locations in order to account for changes in the signal environment that may occur over time;

selecting a subset of the subscriber terminals;

for each subscriber terminal in the subset, obtaining first measurements of a geographical location of the subscriber terminal using Uplink Time Difference of Arrival (U-TDOA), and obtaining second measurements of the downlink signals received at the subscriber terminal at the geographical location, wherein any change that affects signal propagation, such as addition or reconfiguration of base stations or a new building or obstacle is used in calibrating the mapping of signal strength;

updating the mapping responsively to the first and second measurements obtained for the subscriber terminals in the subset; and measuring the geographical locations of at least one of the subscriber terminals in the plurality using the updated mapping.

2. The method according to claim 1, wherein the subscriber terminals in the selected subset are operated by respective subscribers of the communication network for conducting communication sessions by the subscribers.

3. The method according to claim 1, wherein the first measurements for a given subscriber terminal in the subset are based on differences in arrival times of uplink signals from the given subscriber terminal to multiple receivers.

4. The method according to claim 1, wherein the first measurements for a given subscriber terminal in the subset are measured using a satellite receiver in the given subscriber terminal.

5. The method according to claim 1, wherein obtaining the first and second measurements comprises time-synchronizing the first and second measurements pertaining to a given subscriber terminal in the subset.

6. The method according to claim 1, wherein selecting the subset comprises evaluating a selection criterion defined over the communication network, and choosing the subscriber terminals in the subset responsively to the selection criterion.

7. The method according to claim 1, wherein selecting the subset comprises identifying a geographical region in which an accuracy of the mapping is degraded, and adding to the subset at least one subscriber terminal located in the identified geographical region.

8. The method according to claim 1, wherein selecting the subset comprises choosing the subset such that the subscriber terminals in the subset are distributed evenly over a coverage area of the communication network.

9. The method according to claim 1, wherein selecting the subset comprises verifying that the subscriber terminals in the subset are capable of providing the first measurements.

10. The method according to claim 1, wherein selection of the subset, obtaining of the first and second measurements and updating of the mapping are performed in a switching element of the communication network.

11. Apparatus for location tracking, comprising:

an interface, which is configured to communicate with a communication network that includes base stations that transmit downlink signals to a plurality of subscriber terminals;

a storage device, which is configured to store a mapping between geographical locations and respective sets of signal strengths of the downlink signals received from one or more of the base stations at the geographical locations, wherein the storage device further comprises a location system that calibrates the mapping of signal strengths to locations in order to account for changes in the signal environment that may occur over time; and a processor, which is configured to select a subset of the subscriber terminals, to obtain for each subscriber terminal in the subset, first measurements of a geographical location of the subscriber terminal using Uplink Time Difference of Arrival (U-TDOA), to obtain for each subscriber terminal in the subset second measurements of the downlink signals received at the subscriber terminal at the geographical location, to update the mapping responsively to the first and second measurements obtained for the subscriber terminals in the subset, and to measure the geographical locations of at least one of the subscriber terminals in the plurality using the updated mapping, wherein any change that affects signal propagation, such as addition or reconfiguration of base stations or a new building or obstacle is used in calibrating the mapping of signal strength.

12. The apparatus according to claim 11, wherein the subscriber terminals in the selected subset are operated by respective subscribers of the communication network for conducting communication sessions by the subscribers.

13. The apparatus according to claim 11, wherein the first measurements fora given subscriber terminal in the subset are based on differences in arrival times of uplink signals from the given subscriber terminal to multiple receivers.

14. The apparatus according to claim 11, wherein the first measurements for a given subscriber terminal in the subset are measured using a satellite receiver in the given subscriber terminal.

15. The apparatus according to claim 11, wherein the processor is configured to time-synchronize the first and second measurements pertaining to a given subscriber terminal in the subset.

16. The apparatus according to claim 11, wherein the processor is configured to evaluate a selection criterion defined over the communication network, and to select the subscriber terminals in the subset responsively to the selection criterion.

17. The apparatus according to claim 11, wherein the processor is configured to identify a geographical region in which an accuracy of the mapping is degraded, and to add to the subset at least one subscriber terminal located in the identified geographical region.

18. The apparatus according to claim 11, wherein the processor is configured to select the subset such that the subscriber terminals in the subset are distributed evenly over a coverage area of the communication network.

19. The apparatus according to claim 11, wherein the processor is configured to verify that the subscriber terminals in the subset are capable of providing the first measurements.

20. The apparatus according to claim 11, wherein the interface and the processor are comprised in a switching element of the communication network.

* * * * *